United States Patent
Diao et al.

(10) Patent No.: US 7,099,674 B2
(45) Date of Patent: Aug. 29, 2006

(54) APPARATUS AND METHOD FOR IMPLEMENTING MULTI-TRAFFIC LOAD MONITORING AND PREDICTION

(75) Inventors: Xinxi Diao, Shen Zhen (CN); Yi Xie, Shen Zhen (CN); Jun Li, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 325 days.

(21) Appl. No.: 10/417,562

(22) Filed: Apr. 17, 2003

(65) Prior Publication Data

US 2004/0048587 A1 Mar. 11, 2004

Related U.S. Application Data

(63) Continuation of application No. PCT/CN01/01162, filed on Jul. 9, 2001.

(30) Foreign Application Priority Data

Oct. 19, 2000 (CN) .............................. 00 1 25727

(51) Int. Cl.
*H04Q 7/20* (2006.01)
(52) U.S. Cl. .................. 455/453; 455/63.1; 455/67.11; 370/229
(58) Field of Classification Search ................ 455/453, 455/430, 67.11, 509, 63.1; 370/229
See application file for complete search history.

(56) References Cited

U.S. PATENT DOCUMENTS

| | | | | |
|---|---|---|---|---|
| 5,687,171 A * | 11/1997 | Shin et al. | ................... | 370/335 |
| 5,859,838 A * | 1/1999 | Soliman | ....................... | 370/249 |
| 5,907,543 A * | 5/1999 | Jeon et al. | ................... | 370/335 |
| 6,005,852 A * | 12/1999 | Kokko et al. | ................ | 370/329 |
| 6,035,208 A * | 3/2000 | Osawa | ........................ | 455/522 |
| 6,047,189 A | 4/2000 | Yun et al. | | |
| 6,456,850 B1 * | 9/2002 | Kim et al. | .................... | 455/453 |
| 6,868,277 B1 * | 3/2005 | Cerwall et al. | ............. | 455/509 |
| 6,947,751 B1 * | 9/2005 | Ishikawa et al. | ............. | 455/453 |
| 2004/0185786 A1 * | 9/2004 | Mirbaha et al. | ......... | 455/67.11 |
| 2005/0265321 A1 * | 12/2005 | Rappaport et al. | .......... | 370/352 |

FOREIGN PATENT DOCUMENTS

EP 0 889 663 A1 1/1999

OTHER PUBLICATIONS

Ganesh et al., "Traffic Capacity of Cellular Packet CDMA for Varying Cell Size and Propagation Scenarios", 1994 Journal pp. 805-810.*
Liu et al., "SIR—Based Call Admission COntrol for DS-CDMA Cellular Systems" 1994 IEEE Journal of Selected Areas in Communication, vol. 12 pp. 638-644.*

* cited by examiner

*Primary Examiner*—Wing Chan
*Assistant Examiner*—Aamir Haq
(74) *Attorney, Agent, or Firm*—Dorsey & Whitney, LLP

(57) ABSTRACT

An apparatus and method for implementing multi-traffic load monitoring and prediction in a CDMA cellular mobile communication system includes a received signal strength indication (RSSI) measuring unit for measuring total interference power and processing a measured value to eliminate jitters; a parameter accounting or statistic unit for accounting for some traffic parameters associated to the load monitoring and prediction; a load monitoring unit for calculating the load monitoring based on the measured value and statistic results; and a load prediction unit for calculating an increased amount of an up link load after receiving or accessing new traffic and a total load value after receiving or accessing the new traffic based on parameters requested by the new traffic and calculation results transmitted in real time by the load monitoring unit.

5 Claims, 4 Drawing Sheets

APPARATUS AND METHOD FOR IMPLEMENTING MULTI-TRAFFIC LOAD MONITORING AND PREDICTION

CROSS-REFERENCE TO RELATED APPLICATION

This utility patent application is a continuation application and claims priority of the PCT International Patent Application, serial number PCT/CN01/01162, filed on Jul. 9, 2001, which claims the priority of the Chinese patent application, serial number CN 00125727.7, filed on Oct. 19, 2000; subject matter of which are incorporated herewith by reference.

FIELD OF THE INVENTION

The invention relates to a CDMA (code division multiple access) cellular mobile communication system, and more particularly, it relates to an apparatus and method for implementing multi-traffic load monitoring and prediction.

BACKGROUND OF THE INVENTION

Because the same frequency band is used commonly by neighboring cells in a CDMA cellular mobile communication system, the practical capacity of a certain cell (the ability of a radio load of the cell) will be varied due to the strength variation of the interference of the neighboring cells. Particularly, under multi-traffic condition, because the burst feature of data traffic, the interference from the neighboring cells will cause the practical load ability of the present cell to change severely. Under a condition that the interference strength of the neighboring cells changes randomly, it is desired to accurately monitor the present load condition of the cells and predict the variation of the loads of the cells after receiving a new traffic so as to sufficiently utilize radio resources and ensure the quality of communication.

Monitoring system load of a CDMA system and analyzing capacity of a CDMA system are both closely related to interference power (or transmission power). However, the following important distinctions exist between them:

1) The objectives are different: a system capacity analysis is to obtain the extreme value of capacity under some assumptions, while load monitoring is to obtain in real time the practical extreme value of the capacity of the system, the occupation amount of an extreme value of the capacity, and the residual amount of the extreme value of the capacity in the practical operating system; and 2) The methods for processing the parameters are different: the model used for a system capacity analysis has explicitly ideal characteristics; and selected system parameters, acceptance or rejection of the parameters, and the like, are more or less impractical; and the parameters selected for system load monitoring have to include two features: (1) they would reflect a current load condition of a system in real time; and (2) they are operable in a practical system.

Accordingly, due to the above distinctions, the idea, analysis model and interference processing method used for system capacity analysis cannot be used for load monitoring. It is desired that load monitoring has its own analysis idea, analysis model, interference processing method, and parameter selection method.

A radio load monitoring method for a CDMA mobile communication system disclosed in U.S. Pat. No. 5,687,171 monitors load from an aspect of a granted access control. The method includes the following steps:

1) Measuring interference strength received by a base station;

2) Subtracting the measured interference strength from permitted total interference strength to obtain an interference tolerance value;

3) Calculating whether the interference produced after receiving new traffic exceeds the interference tolerance value obtained in step 2); and 4) Permitting access if the interference produced does not exceed the interference tolerance value; otherwise, rejecting access.

The above granted access method is based on load monitoring and prediction. However, the method does not address how to perform the load monitoring of multi-traffic and calculate interference produced after receiving new traffic.

The U.S. Pat. No. 6,005,852 and U.S. Pat. No. 5,790,534 submitted by Nokia disclosed a load control system which is composed of two parts of load control and load monitoring, in which a load control stratagem, such as granted access control, re-consultation of QoS, increasing of the delay of data traffics, and the like, is implemented in-real time (up to a measuring interval of 10 ms for providing the load condition of a cell, and a load control unit is based on an output of a load monitoring unit and incorporates the load condition of the neighboring cells) by the load monitoring for the load monitoring unit. The base station checks the current capacity (that is the actual capacity of the base station under interference condition, and the actual capacity can be indicated by traffic code rate and interference power) of the cell for each radio frame. Particularly, the permitted interference power of data traffics of the present cell is calculated by a load monitoring unit according to a frame period. If the interference of circuit traffics or the interference of neighboring cells changes, packet traffic load of a present cell is adjusted.

However, the above system does not implement the prediction under multi-traffic and lacks specific schemes of a load monitoring method for distinguishing traffics having different priorities.

The objective of the present invention is to provide an apparatus and method for implementing multi-traffic load monitoring and prediction in a CDMA cellular mobile communication system to monitor in real time the loads of different traffic types or the loads of the same traffic type having different priorities, to predict in real time the load of newly received traffic, to utilize radio resources sufficiently, to ensure system stability, and to improve quality of communication.

SUMMARY OF THE INVENTION

In order to realize the above objective, an apparatus for implementing multi-traffic load monitoring and prediction in accordance with the principles of the present invention, comprises:

a received signal strength indication (RSSI) measuring unit for measuring total interference power received from an external receiver and processing a measured value to eliminate jitters;

a parameter statistic unit for accounting for at least one traffic parameter associated to the load monitoring and prediction based on contents of an external traffic report storage unit to provide necessary data for monitoring and calculating load and to obtain calculation results;

a load monitoring unit for calculating monitored load and obtaining the calculation results based on measured values of the received signal strength measuring unit and the statistic results of the parameter statistic unit; and a load prediction unit for calculating increased amount of an up link load after receiving new traffic and a total load value after receiving the new traffic based on request parameters of the new traffic transferred from an external load control unit and the calculation results transmitted in real time by the load monitoring unit, and for providing the calculation results for using by the external load control unit.

In order to realize the above objective, a method for implementing multi-traffic load monitoring and prediction in accordance with the principles of the present invention, comprises the steps of:

initializing a received signal strength indication (RSSI) measuring unit to operate;

determining whether a predetermined standby time has reached or not: if the predetermined standby time has not reached, waiting continuously; if the predetermined standby time has reached, proceeding to the next step;

classifying and accounting parameters of respective traffics;

inputting a measured value of received signal strength;

calculating loads of traffics having a different signal to noise ratio according to a prescribed equation and calculating corresponding equivalent interference power values;

accounting loads of different traffic types and the loads of the traffics having different priorities in the same traffic type; and storing the calculation results of the former two steps for using by load control and load prediction, and the above procedure being repeated as such to obtain a next calculation result.

In order to realize the above objective, a method for implementing multi-traffic load monitoring in accordance with the principles of the present invention, comprises the steps of:

initializing a received signal strength measuring unit to operate;

deciding whether a predetermined standby time has reached or not: if the predetermined standby time has not reached, waiting continuously; if the predetermined standby time has reached, proceeding to the next step;

classifying and accounting parameters of respective traffics;

inputting a measured value of a received signal strength;

calculating loads of traffics having a different signal to noise ratio according to a prescribed equation and calculating corresponding equivalent interference power values;

accounting loads of different traffic types and loads of the traffics having different priorities in the same traffic type;

storing the calculation results of the former two steps for using by load control and load prediction, the above procedure being repeated as such to obtain the next calculation result;

deciding constantly whether a new traffic is received or not: if the new traffic is not received, deciding continuously; if the new traffic is received, proceeding to the next step to input a present equivalent interference power value;

inputting new traffic parameters;

calculating load of new traffic and a received signal strength value after receiving the new traffic according to the prescribed equation; and storing calculation results for using by the load control.

In the above method for implementing multi-traffic load monitoring and prediction, the traffic parameters comprise a received signal strength indication value, a transmission code rate, a frequency spread factor, a signal to interference ratio, and traffic priority.

In the above method for implementing multi-traffic load monitoring and prediction, the method for accounting the loads of different traffic types and the loads of the traffics having different priorities in the same traffic type comprises:

calculating, respectively, interference power of the different traffics according to a prescribed equation;

summing the interference power of the traffics having the same priority based on a sequence of the priorities; and obtaining a total load of the traffics having the respective priorities.

DETAILED DESCRIPTION OF THE PREFERRED EMBODIMENTS

Based on the analysis of the practical requirement of the load control, the present invention is based on at least the following:

1) A monitoring value of received signal strength indication (RSSI) is a physical quantity having a measurement error, which is a requirement for ensuring system stability.

2) A prediction value of the received signal strength indication (RSSI) after receiving new traffic is a physical quantity having a measurement error, which is a requirement for ensuring system stability.

3) Only relativity is required for monitoring values of loads of respective traffics (a proportion corresponding to the loads of the other traffics is the most important), so that the difficulty faced by solving absolute load values can be prevented, and also the requirement of the load control stratagem can be satisfied.

4) Only relativity is required for prediction values of loads of the respective traffics (it is only required that it keep consistent with the load values obtained from the load monitoring), so that solving absolute quantity of a load increment of new traffics can be prevented, and also the requirement of the load control stratagem can be satisfied. This is because the load prediction and the load monitoring are the relative results obtained under the same premise, and the relative values can indicate the magnitude relationships among the absolute values of the loads of the respective traffics. The respective control stratagems can be implemented in turn without obtaining the absolute load quantity of the respective traffics.

5) It is only required that the interference power (N) be conceptual, and the absolute N value is not important, because the relative results of both 3) and 4) can be obtained by the conceptual N value. Such relative results can satisfy the requirement for implementing the respective load control stratagems.

The understanding of the entire requirement of the load monitoring reflected by the above 3), 4), and 5) is the base for developing the present invention, such understanding makes us give up the monitoring and predicting of the absolute load of the respective traffics. In this way, not only some technology difficulties for monitoring the absolute loads can be avoided (for example, solving the absolute values of the interference power of the other cells), but also the present invention can satisfy the respective requirements of the resource management (for example, pre-flow of the resources during switching, or the traffic having low priority being interrupted for accessing traffic having high priority in granted access control, etc.)

One of the advantages of a load monitoring and prediction method and apparatus of the present invention is that it allows simple calculation and easy implementation with respect to prior load monitoring technology.

Figure 1:
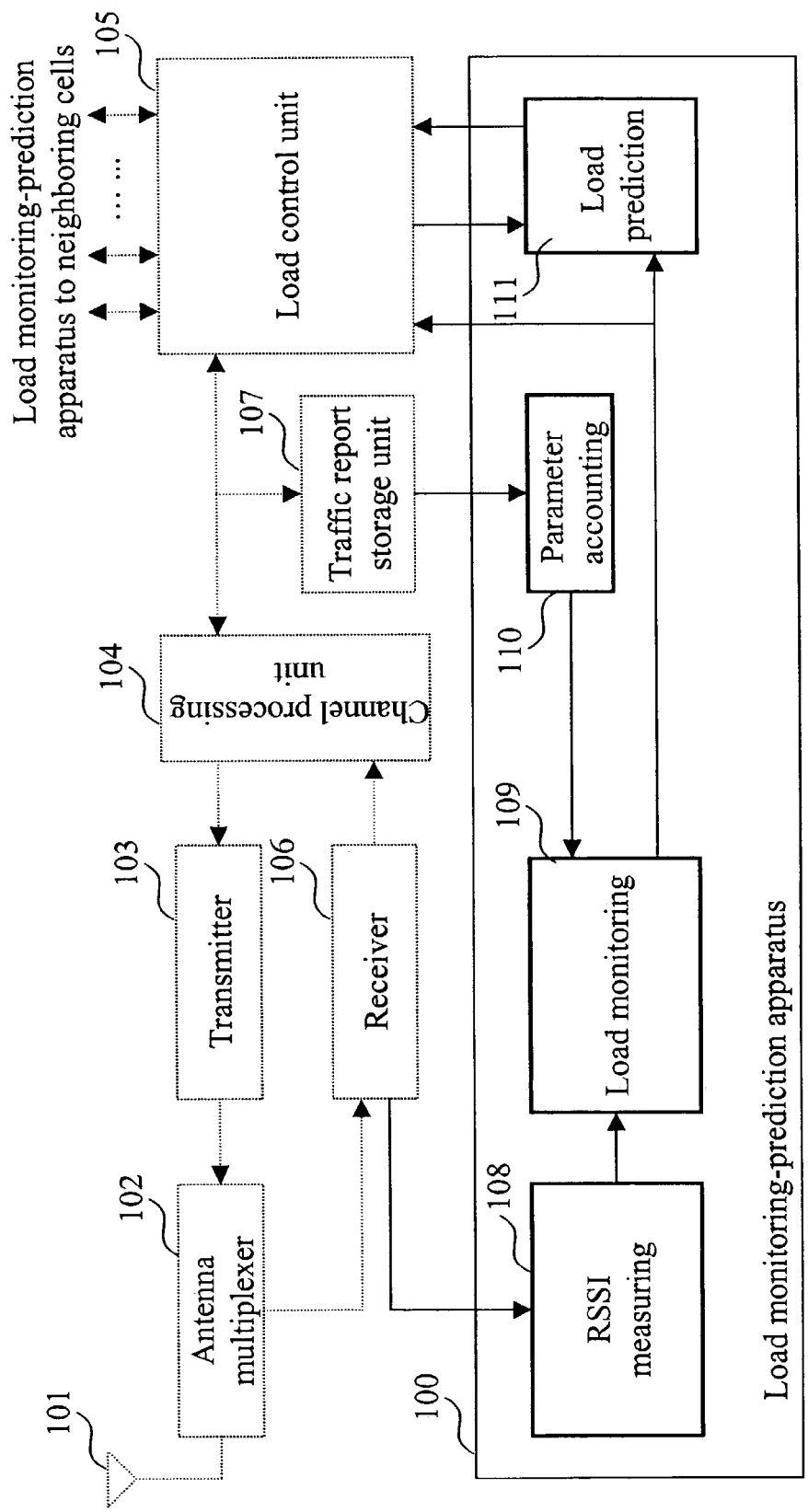
FIG. 1 is a functional block diagram of one embodiment of a load monitoring and prediction apparatus in accordance with the principles of the present invention.

One embodiment of a load monitoring and prediction apparatus 100 and the relationships between the apparatus 100 and the other functional units of a base station 20 of a cellular mobile communication system (these functional units can be located in different sub-systems in the cellular mobile communication system) are shown in FIG. 1. The base station 20 includes an antenna 101 which may be an antenna in all direction or may be divided into sectors; an antenna multiplexer 102 which serves the function of isolating the reception and transmission; a transmitter 103 which transmits various control information to a mobile station (not shown); a channel processing unit 104 which includes an up link channel processing and a down link channel processing; a load control unit 105 which implements various load control functions (the load control described in the present invention comprises a grant access control, a breath control and a congestion control, and the like); a receiver 106 which is composed of a radio frequency processing unit and a correlation demodulator (not shown); and a traffic report storage unit 107 which stores traffic characteristic parameters of various traffics (for example, a transmission code rate, an encoding format, a signal to interference ratio ("SIR"), priority, and a frequency spread factor, and the like) and refreshes in real time the contents stored therein based on the variation of the traffic characteristic parameters.

Figure 2:
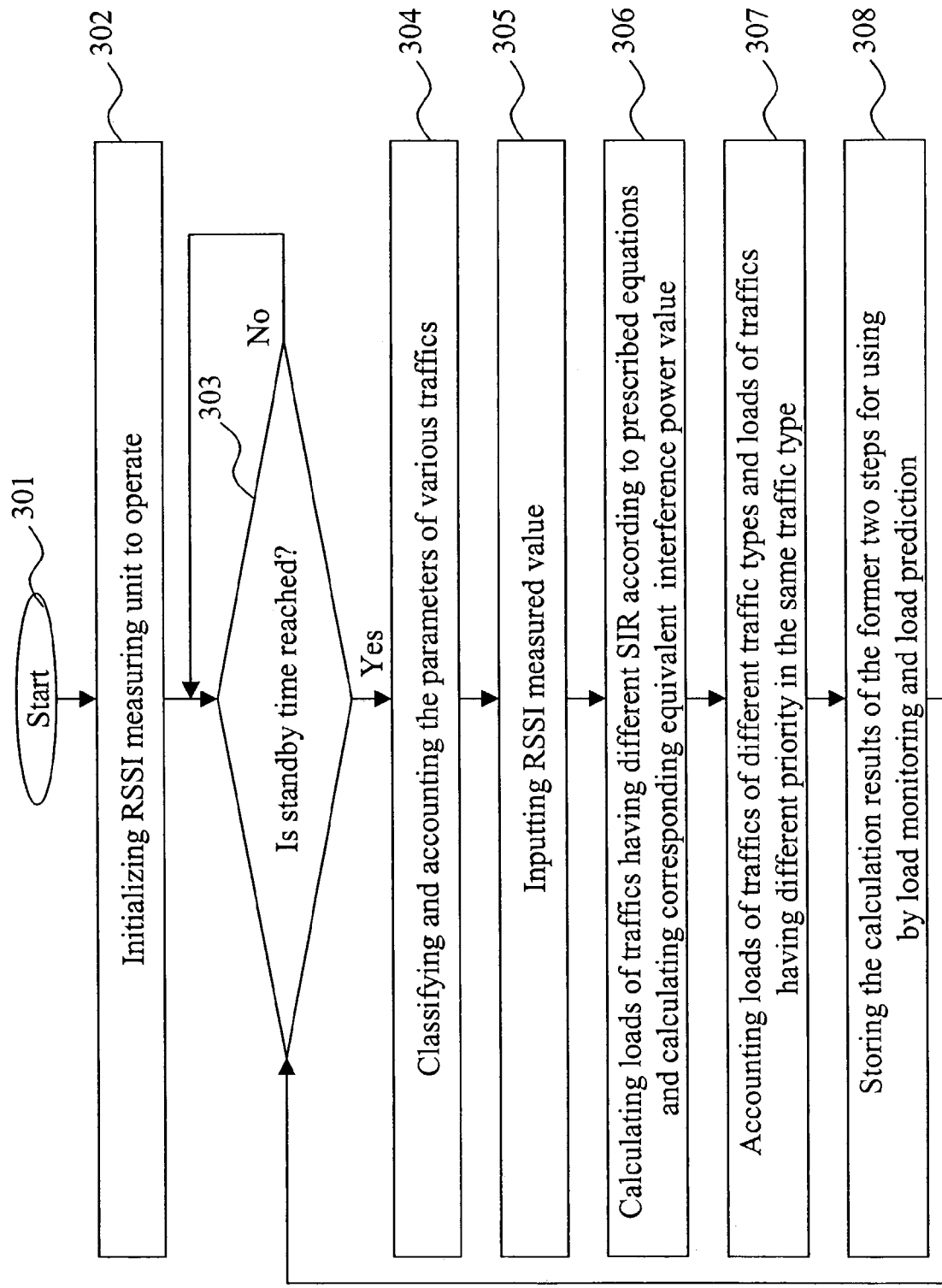
FIG. 2 is a flowchart of one implementation of a load monitoring method in accordance with the principles of the present invention.
Figure 3:
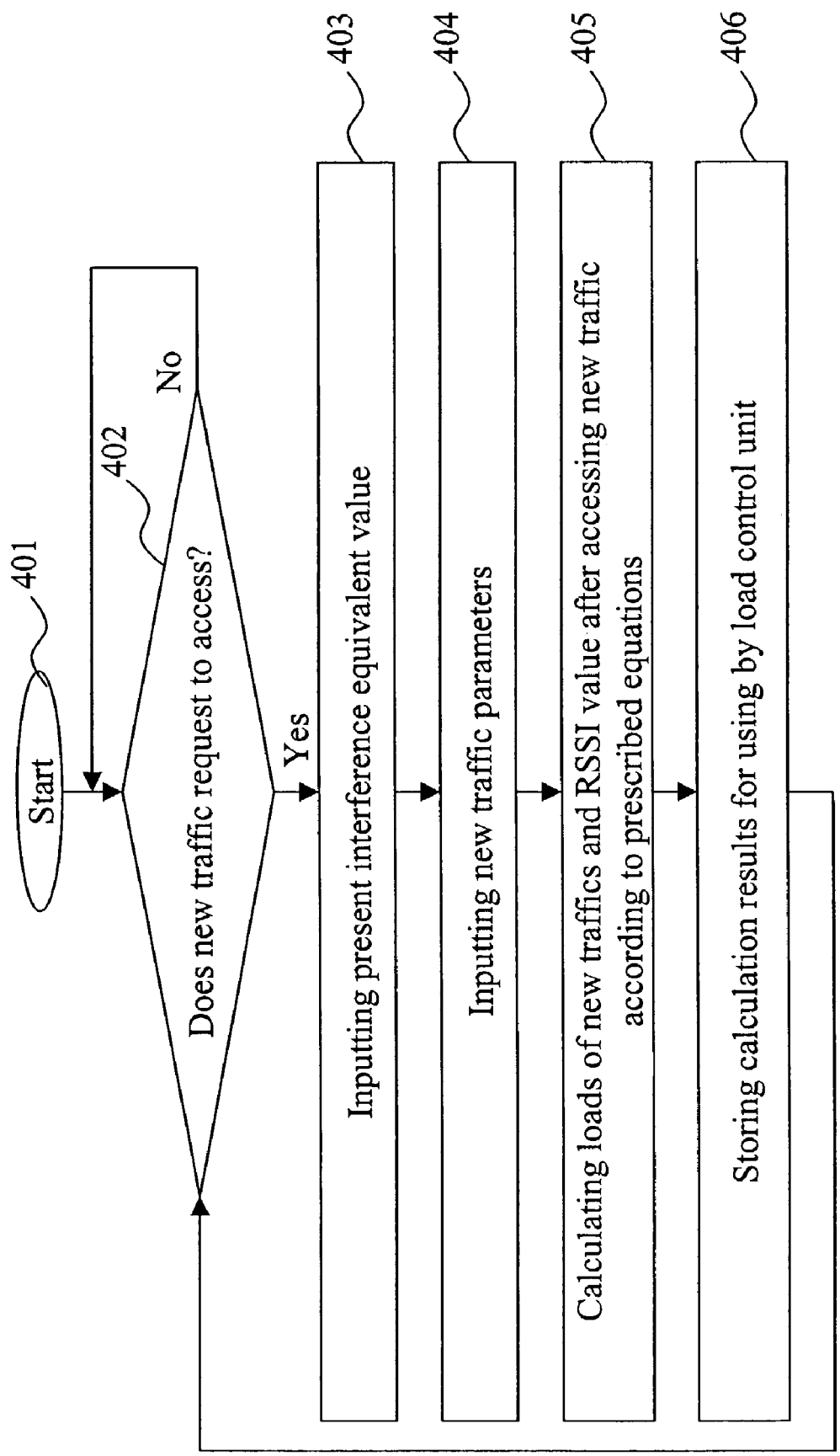
FIG. 3 is a flowchart of one implementation of a load monitoring and prediction method in accordance with the principles of the present invention.

The load monitoring and prediction apparatus 100 comprises a RSSI measuring unit 108, a load monitoring unit 109, a parameter accounting or statistic unit 110, and a load prediction unit 111. These functional units can be distributed in different sub-systems of the cellular mobile communication system based on the implementation requirements of the system. The total interference power received by the receiver 106 (at the input port of the demodulator) is measured by the RSSI measuring unit 108, and the measured values are processed to eliminate jitters of the measured values. Some traffic parameters relating to the load monitoring and prediction (for example, the transmission code rate, frequency spread factor, SIR value, and traffic priority, etc.) are accounted by the parameter accounting or statistic unit 110 based on the contents of the traffic report storage unit 107. The necessary data for calculating the load monitoring are provided to the load monitoring unit 109. The load monitoring calculation is performed by the load monitoring unit 109 based on the measured values of the RSSI measuring unit 108 and the statistic results of the parameter accounting or statistic unit 110. The algorithm procedure of load monitoring 109 is shown in FIG. 3 and the load statistic calculation of load monitoring 109 is shown in FIG. 2. The increased amount of the up link load after receiving the new traffic and the total load amount after receiving the new traffic are calculated by the load prediction unit 111 based on the new traffic request parameter transferred by the load control unit 105 and the present output of the load monitoring unit 109, and the calculation results are provided for outputting to the load control unit 105.

The principle of the flow chart of the load monitoring algorithm as shown in FIG. 2 is as follows, assuming that:

1) there are n types (corresponding to different signal to interference ratio) of traffics, the total code rates of each type of the traffics are $r_1, r_2, r_3, r_4, \ldots, r_n$, respectively;

2) the signal to interference ratio required by each type of the traffics are $SIR_1, SIR_2, \ldots SIR_n$, respectively;

3) the code rate of the jth type of the traffics is (a set of equations can be obtained according to the definition of the signal to interference ratio as follows):

$$\frac{\frac{r_{1j}}{r1}P_1}{\frac{r1-r1j}{r1}p1+p2+\cdots+Pn+N} = SIR_1/G_i \qquad (1)$$

$$\frac{\frac{r_{2j}}{r2}P_n}{p1+\frac{r2-r2j}{r2}p2+\cdots+Pn+N} = SIR_2/G_i \qquad (2)$$

$$\ldots$$

$$\frac{\frac{r_{nj}}{rn}P_n}{p1+p2+\cdots+\frac{rn-r_{nj}}{rn}Pn+N} = SIR_n/G_n \qquad (n)$$

$$P1+p2+\ldots+P_n+N=RSSI \qquad (n+1)$$

wherein:

$N = N_0 + I_{other}$; and $P_i$ is the received power of the ith type of the traffics.

In equation (1) to equation (n+1), RSSI, SIR1, SIR2, ..., SIRn can be obtained by measuring; and $r_1, r_2, r_3, r_4, \ldots, r_n$ and rij can be obtained from the parameter accounting or statistic unit 110 (based on TFCI information). Gi~Gm can be provided by the traffic report storage unit 107.

By solving the above equations, n+1 unknown quantities can be obtained: $P_1, P_2, \ldots P_n$, N. In this way, the magnitudes of the load amount and the interference of various traffics can be obtained, and such monitoring is performed with a period of 10 ms.

In order to simplify the solving procedure, the following relationship can be used:

$$\frac{r1-r1j}{r1}P1+P2+\cdots+Pn+N = RSSI - \frac{r1j}{r1}P$$

As shown in FIG. 2, step 304 is also based on the calculation requirements of step 306 and step 307, the data in the traffic report storage unit 107, such as the transmission code rate, frequency spread factor, SIR value, traffic priority are accounted and processed.

Based on the algorithm procedure in FIG. 2, the relative values of various traffic loads are obtained. It has been indicated above, the difficulty faced by solving the absolute load values can be prevented (if it is required to obtain the absolute interference power values, the complexity of the system will be increased, and the implementation will be difficult), and the requirement of the load control stratagem can be satisfied.

The principle of the prediction algorithm indicated by the load prediction algorithm flow chart is shown in FIG. 3. The prediction is performed on a short period of time interval, such as 10 ms, so that the interference variation amount of the other cells is very small. Therefore, in this case, it can be considered that N value is unchanged during the next 10 ms.

Assuming that a traffic subject to SIR, requests to access, the required code rate is $R_{l,k}$, in order to predict the RSSI value after receiving the traffic, the following calculation is required:

(1) A new $r_i$ value is calculated based on $R_{l,k}$ and the new $r_i$ value and $R_{l,k}$ are substituted into equation (1);

(2) Based on equations (1) to (n) and utilizing N value monitored and measured in the former 10 ms to solve $P_1$, $P_2, \ldots P_n$, $N_i$;

(3) $P_1, P_2, \ldots P_n$, N, and N value are substituted into the equation (n+1), and the RSSI prediction value of the next 10 ms can be obtained.

If there are a plurality of traffics requesting to access simultaneously, the above steps will be utilized once and the complete results can be obtained.

The procedure of the load prediction algorithm is shown in FIG. 3. Steps 403, 404 and 405 in the FIG. 3 are three key steps for implementing the load prediction.

Figure 4:
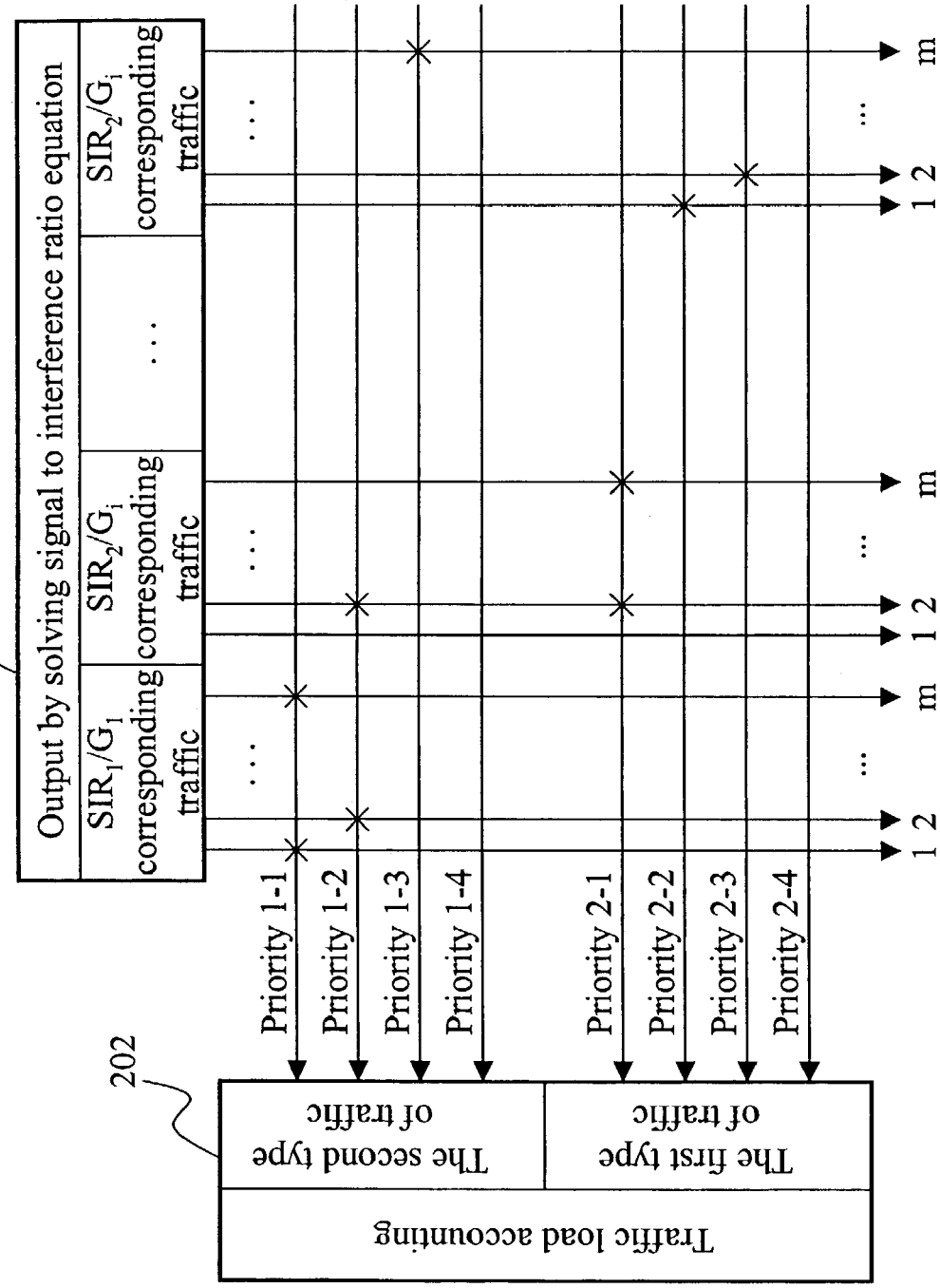
FIG. 4 is a schematic diagram of statistic calculation of loads of traffics belonging to different types and having different priorities.

The calculations for the loads of different traffic types and for the loads of the traffics having different priorities in the same traffic type can be accounted according to the calculation structure shown in FIG. 4. In FIG. 4, a set of load values obtained by solving the respective signal to interference ratio equations are included in a signal to interference ratio solving output unit 201, each value in the set of the load values may be the comprehension of the traffics of different types and different priorities and may also correspond to the loads of a plurality of users. Meanwhile, the traffic loads of the same user may also be included in the solving results of a plurality of signal to interference ratio equations. Therefore, in order to account the traffic loads under various conditions, it may be required to use a statistic calculation structure with a matrix form, and the statistic results are stored into the load accounting or statistic unit 202. Under a multi-traffic condition, the same user may establish simultaneously a plurality of traffic connections (for example, a multi-media user may transmit simultaneously three traffics, such as voice, data and video, and these traffics can use different signal to interference ratio, different priority, and different code rate). In order to obtain the loads of a user, the results in 202 can further be accounted.

INDUSTRY APPLICABILITY

Under a multi-traffic (voice, data, video) condition, the present invention utilizes fully radio resources. The loads of different traffic types, having different priorities are monitored accurately (if the load is very heavy, and new traffic having higher priority requests to access, the system will employ a stratagem that interrupts the prior traffic having low priority and accesses a new traffic), and the load of the traffic, which requests to access, will be predicted accurately. The stratagem of controlling the loads (or controlling the current) is implemented effectively to provide present load values of the traffics of different traffic types and the traffics having different priorities in the same traffic type. Accordingly, the quality of the communication can be ensured, and the stability of the system can be maintained.

What is claimed is:

1. An apparatus for implementing multi-traffic load monitoring and prediction, comprising:
    a received signal strength indication (RSSI) measuring unit for measuring total interference power received from an external receiver;
    a parameter statistic unit for accounting for a plurality of traffic parameters associated to the load monitoring and prediction based on content of an external traffic report storage unit to provide necessary data for monitoring and calculating load, wherein the traffic parameters comprise a received signal strength indication value, a transmission code rate, a frequency spread factor, a signal to interference ratio, and traffic priority;
    a load monitoring unit for calculating load and obtaining calculation results based on the measured total interference power value of the received signal strength indication (RSSI) measuring unit and statistic results associated to the traffic parameters of the parameter statistic unit; and
    a load prediction unit for calculating an increased amount of up link load after receiving new traffic and a total load value after receiving the new traffic based on requesting parameters of the new traffic transferred by an external load control unit and the calculation results transmitted in real time by the load monitoring unit, and for providing the calculation results to the external load control unit.

2. A method for implementing multi-traffic load monitoring, comprising the steps of:
    initializing operation of a received signal strength indication (RSSI) measuring unit;
    determining whether a predetermined standby time has reached or not: if the predetermined standby time has not reached, waiting continuously; if the predetermined standby time has reached, proceeding to the next step;
    classifying and accounting parameters of respective traffics;
    inputting a measured value of received signal strength;
    calculating a ratio of the traffics to the received signal strength, that is, calculating loads of traffics having a different signal to noise ratio according to a prescribed equation and calculating corresponding equivalent interference power values;
    accounting loads of different traffic types and the loads of the traffics having different priorities in the same traffic type; and
    storing the calculation results of the former two steps for using by load control and load prediction, and the above procedure being repeated as such to obtain a next calculation result;
    wherein the traffic parameters comprise a received signal strength indication value, a transmission code rate, a frequency spread factor, a signal to interference ratio, and traffic priority.

3. The method of claim 2, wherein the method for accounting the loads of different traffic types and loads of the traffics having different priorities in the same traffic type comprises the steps of:
    calculating, respectively, interference power of the different traffics according to a prescribed equation;
    summing the interference power of the traffics having the same priority, said priority is in a sequence of the priorities; and
    obtaining a total load of the traffics having the respective priorities.

4. A method for implementing multi-traffic load monitoring and prediction, comprising the steps of:
   initializing operation of a received signal strength indication (RSSI) measuring unit;
   deciding whether a predetermined standby time has reached or not: if the predetermined standby time has not reached, waiting continuously; if the predetermined standby time has reached, proceeding to the next step;
   classifying and accounting parameters of respective traffics;
   inputting a measured value of a received signal strength;
   calculating a ratio of the traffics to the received signal strength, that is, calculating loads of traffics having a different signal to noise ratio according to a prescribed equation and calculating corresponding equivalent interference power values;
   accounting loads of different traffic types and loads of the traffics having different priorities in the same traffic type;
   storing the calculation results of the former two steps for using by load control and load prediction, the above procedure being repeated as such to obtain the next calculation result;
   deciding constantly in real time whether a new traffic is received or not: if the new traffic is not received, deciding continuously; if the new traffic is received, proceeding to the next step to input a present equivalent interference power value;
   inputting the current equivalent interference power value;
   inputting new traffic parameters;
   calculating load of new traffic and a received signal strength value after receiving the new traffic according to the prescribed equation; and
   storing calculation results for using by the load control, wherein the traffic parameters comprise a received signal strength indication value, a transmission code rate, a frequency spread factor, a signal to interference ratio, and traffic priority.

5. The method of claim 4, wherein the method for accounting the loads of different traffic types and loads of the traffics having different priorities in the same traffic type comprises the steps of:
   calculating, respectively, interference power of the different traffics according to a prescribed equation;
   summing the interference power of the traffics having the same priority, said priority is in a sequence of the priorities; and
   obtaining a total load of the traffics having the respective priorities.

* * * * *